Patented Sept. 27, 1932

1,880,041

UNITED STATES PATENT OFFICE

GEORGE A. RICHTER AND PHILIP C. SCHERER, JR., OF BERLIN, NEW HAMPSHIRE, ASSIGNORS TO BROWN COMPANY, OF BERLIN, NEW HAMPSHIRE, A CORPORATION OF MAINE

STABILIZATION OF CELLULOSE XANTHATE

No Drawing. Application filed October 15, 1928. Serial No. 312,747.

In the production of cellulose xanthate, cellulose fiber such as wood pulp or cotton linters is used as a raw material, the fiber usually being in the form of sheets, to facilitate handling and chemical treatment. The sheets are immersed in caustic soda solution of mercerizing strength until thoroughly saturated, and then pressed free of excess solution. The pressed sheets of soda cellulose, so-called, are then comminuted, as by grinding, into a fluffy mass which is aged, usually for about 24 to 96 hours while exposed to air at about 20° C. The aged product is treated with sufficient carbon bisulphide to effect xanthation, the resulting cellulose xanthate being an orange-colored product which is soluble in a solution of alkali to produce a solution or syrup which is known as viscose and which may be spun into artificial silk or used in making films or as a size for textiles or the like.

Cellulose xanthate produced as hereinbefore described is quite unstable while in the moist condition, sulphur groups progressively splitting off to form complexes containing a higher percentage of cellulose than the xanthate, so that when spontaneous decomposition is allowed to proceed, a substantially complete regeneration of the cellulose may take place.

In the past, attempts at stabilization of cellulose xanthate have not succeeded owing to the failure to recognize that this spontaneous and progressive decomposition is largely caused by hydrolysis in the sense of the following equations:

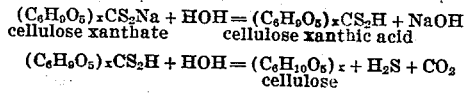

Thus, any process which will tend to repress hydrolysis will tend to stabilize the cellulose xanthate. We have found that gelling of viscose solution may be prevented for considerably longer than normal by adding to the solution products of the hydrolysis and thus repressing such hydrolysis. We have further found that the simplest way in which to prevent hydrolysis is to remove all moisture, upon which, decomposition caused by hydrolysis becomes impossible, if the bone-dry product is kept from contact with moisture or the atmosphere until used. Removal of moisture from cellulose xanthate may be accomplished in any of the customary ways of removing moisture, but we have found that the best results are obtained if that removal is carried out very rapidly and at low temperatures. If high temperatures and long periods of dehydration are used, decomposition of cellulose xanthate may ensue before dehydration is complete.

The object of the present invention is to effect a sufficient stabilization of cellulose xanthate so that it may be kept for a considerable period without undergoing material decomposition. We have found that this object may be attained by dehydrating the xanthate, providing that this dehydration is carried out as rapidly and at as low a temperature as possible, as hereinbefore described. The dehydrated product so obtained may be preserved indefinitely, provided it is kept out of contact with moisture. A further way of preserving the product is by grinding it to comparatively small particle size, and coating the particles with a water-repellent material, preferably one which is soluble in a solution of alkali, so that the stabilized xanthate may be dissolved as usual to form viscose. We have also found that the stability of the xanthate may be further increased and a lower viscosity viscose obtained if impurities are removed from the xanthate before its dehydration.

The purification of the cellulose xanthate may be effected immediately after xanthation, that is, while in the form of a mass of crumbs, as by treating with a mixture of acetic acid and alcohol or other suitable reagent which effects a removal of secondary reaction products and excess caustic soda, the color of the xanthate changing to light yellow while the reagent assumes a dark orange or brown color. The xanthate is then pressed free of excess reagent and dried, preferably under vacuum conditions and at a comparatively low temperature, say 20° to 30° C., under which conditions dehydration is rapidly accomplished. Or the xanthate may be purified by dissolving in a solution of alkali and then precipitating the xanthate from solution by the addition of a suitable precipitant, such as acetic acid, alcohol, or ammonium chloride solution, or by delivering the solution of xanthate through a spinneret into a precipitating bath in thin ribbon or filament form. The resulting flocculent precipitate or continuous ribbon or filament of cellulose xanthate may be washed, dehydrated, and pulverized.

A better appreciation of the present invention may be had from the following specific example of procedure which was found to give satisfactory results in actual practice, starting with a raw material such as the orange-colored xanthated crumbs of fiber usually obtained, purified xanthate crumbs, or precipitated and washed cellulose xanthate in flocculent condition or in the form of continuous ribbon or filament. The cellulose xanthate in any one of these forms is first subjected to dehydration, say under a vacuum of about 28 inches and at 20° to 30° C., until a bone-dry product has been produced. The dry product is then ground to fine particle size, say until the particles pass through a 200-mesh sieve, as by passing through a ball mill preferably maintained under vacuum conditions or in a dry atmosphere to prevent decomposition of the xanthate during the grinding operation. The dry xanthate powder is then preserved in hermetically sealed containers or is treated with a solution of water-repellent material in an organic solvent such, for example, as ether or alcohol. For instance, it may be intimately mixed with a solution of stearic acid, or the glycerides of stearic, palmitic, or oleic acid until the particles have been uniformly wetted, the solution being of a strength to have a coating of, say, about 1% by weight of water-repellent materials on the particles. The resulting mass may be pressed free of excess solution and dried under vacuum and low-temperature conditions. A cellulose xanthate thus stabilized may be kept for months without spoiling. It may be readily dissolved in caustic soda solution to produce a solution suitable for the manufacture of artificial silk and films, or for use in the sizing of textiles or the like. The present invention thus makes possible the production of xanthate where the necessary raw materials are available at low cost and other conditions favorable, and the selling and shipping of the stabilized product to rayon or textile plants so situated as to be unable to produce cellulose xanthate economically, or to small users who find it more advantageous to buy the xanthate than to prepare it themselves.

Having thus discussed certain embodiments of this invention, it should be evident to those skilled in the art that various changes and modifications might be made therein without departing from the spirit or scope of invention as defined in the appended claims.

What we claim is:

1. An article of manufacture consisting of dehydrated cellulose xanthate treated with water-repellent material.

2. An article of manufacture consisting of dehydrated cellulose xanthate particles coated with water-repellent material soluble in a solution of alkali.

3. An article of manufacture consisting of dehydrated cellulose xanthate freed from impurities and treated with water-repellent material.

4. An article of manufacture consisting of dehydrated, precipitated cellulose xanthate treated with water-repellent material soluble in a solution of alkali.

5. A process which comprises dehydrating cellulose xanthate and then treating with a with a water-repellent material.

6. A process which comprises dehydrating cellulose xanthate, treating with a solution of water-repellent material in an organic solvent of said material, and removing the solvent.

7. A process which comprises dehydrating cellulose xanthate, pulverizing, treating the powder with a solution of water-repellent material in an organic solvent of said material, and removing the solvent.

8. A process which comprises dehydrating cellulose xanthate, pulverizing, and treating with a water-repellent material.

9. An article of manufacture consisting of dehydrated cellulose xanthate particles uniformly coated with about 1% by weight of water-repellent material.

10. An article of manufacture consisting of dehydrated cellulose xanthate treated with fatty acid material.

11. An article of manufacture consisting of dehydrated cellulose xanthate treated with stearic acid.

12. An article of manufacture consisting of dehydrated, precipitated cellulose xanthate treated with water-repellent material.

In testimony whereof we have affixed our signatures.

GEORGE A. RICHTER.
PHILIP C. SCHERER, Jr.